(12) United States Patent
Patel et al.

(10) Patent No.: US 6,770,602 B2
(45) Date of Patent: Aug. 3, 2004

(54) OIL BASED WELL FLUIDS WITH HIGH SOLIDS CONTENT

(75) Inventors: Arvind D. Patel, Sugar Land, TX (US);
Reginald Bell, Houston, TX (US);
Burhan Hoxha, Houston, TX (US);
Jim Friedheim, Spring, TX (US)

(73) Assignee: M-I LLC, Houston, TX (US)

( * ) Notice: Subject to any disclaimer, the term of this patent is extended or adjusted under 35 U.S.C. 154(b) by 93 days.

(21) Appl. No.: 10/062,854

(22) Filed: Jan. 31, 2002

(65) Prior Publication Data

US 2003/0158046 A1 Aug. 21, 2003

(51) Int. Cl.⁷ .................................................. C09K 7/06
(52) U.S. Cl. ...................................... 507/130; 507/243
(58) Field of Search .................................. 507/130, 243

(56) References Cited

U.S. PATENT DOCUMENTS

| | | | |
|---|---|---|---|
| 2,292,208 A | * 8/1942 | De Groote | 507/243 |
| 2,999,063 A | * 9/1961 | Hoeppel | 507/128 |
| 3,527,584 A | * 9/1970 | Thayer | 44/342 |
| 3,728,277 A | * 4/1973 | Foley | 516/27 |
| 4,374,737 A | * 2/1983 | Larson et al. | 507/130 |
| 4,478,602 A | 10/1984 | Kelley et al. | 44/51 |
| 4,713,183 A | 12/1987 | Patel et al. | 252/8.515 |

OTHER PUBLICATIONS

International Search Report—International Application No. PCT/US 03/02903—International Filing Date Jan. 31, 2003—Applicant: M–I L.L.C.

* cited by examiner

*Primary Examiner*—Philip C. Tucker
(74) *Attorney, Agent, or Firm*—Howrey Simon Arnold & White, LLP

(57) ABSTRACT

A fluid having utility in subterranean wells is formulated to include: an oleaginous fluid; and a solids tolerance agent having the formula:

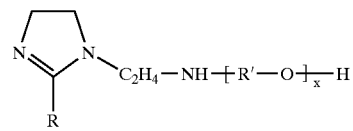

in which R is a $C_6$ to $C_{20}$ aliphatic group and R' is a $C_2$ to $C_6$ aliphatic group and x has a value from about 1 to about 10. Preferably R' is selected from ethyl and isopropyl and R is an unsaturated aliphatic group. The fluid is formulated such that the oleaginous fluid is from about 30% to about 99% by volume of said fluid. In one illustrative embodiment, the oleaginous fluid is composed from about 5% to about 100% by volume of the oleaginous fluid of a material selected from a group consisting of diesel oil, mineral oil, synthetic oil, esters, ethers, acetals, di-alkylcarbonates, olefins, and combinations of these and similar fluids. A non-oleaginous fluid may also be included in the formulation that is from about 1% to about 70% by volume of said fluid. The non-oleaginous fluid is preferably selected from sea water, a brine containing organic or inorganic dissolved salts, a liquid containing water-miscible organic compounds, and combinations thereof. Also included in the fluid formulation may be weighting agents, fluids loss agents, viscosity agents and other similar agents utilized in the formulation of oil-based and invert emulsion drilling fluids.

34 Claims, No Drawings

OIL BASED WELL FLUIDS WITH HIGH SOLIDS CONTENT

BACKGROUND OF THE INVENTION

Many types of fluids have been used in well bores particularly in connection with the drilling of oil and gas wells. The selection of an oil-based well bore fluid involves a careful balance of the both the good and bad characteristics of such fluids in a particular application. The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil-based mud can be justified.

Despite the many benefits of utilizing oil-based muds, they have disadvantages. In general, the use of oil based drilling fluids and muds has high initial and operational costs. These costs can be significant depending on the depth of the hole to be drilled. However, often the higher costs can be justified if the oil based drilling fluid prevents the caving in or hole enlargement which can greatly increase drilling time and costs.

In general, drilling fluids should be pumpable under pressure down through strings of drilling pipe, then through and around the drilling bit head deep in the earth, and then returned back to the earth surface through an annulus between the outside of the drill stem and the hole wall or casing. Beyond providing drilling lubrication and efficiency, and retarding wear, drilling fluids should suspend and transport solid particles to the surface for screening out and disposal. In addition, the fluids should be capable of suspending additive weighting agents (to increase specific gravity of the mud), generally finely ground barites (barium sulfate ore), and transport clay and other substances capable of adhering to and coating the borehold surface.

Drilling fluids are generally characterized as thixotropic fluid systems. That is they exhibit low viscosity when sheared, such as when in circulation (as occurs during pumping or contact with the moving drilling bit. However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be removed or otherwise settle out from the liquid fraction.

Thus a search has been going on for many years for an improved additive for modifying and controlling the solids tolerance properties of drilling fluids that will provide fluids which are efficient, easily handled, and readily dispersible, and usable under high solids contamination and other broad range of conditions.

SUMMARY OF THE INVENTION

The present invention is generally directed to a fluid having utility in subterranean wells having improved solids tolerance capabilities. One such illustrative fluid includes an oleaginous fluid; and a solids tolerance agent having the formula:

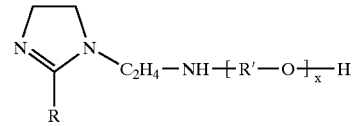

in which R is a $C_6$ to $C_{20}$ aliphatic group and R' is a $C_2$ to $C_6$ aliphatic group and x has a value from about 1 to about 10. In one preferred embodiment of the above fluid, the R' group is ethyl or isopropyl. In another preferred embodiment, the R is unsaturated having at least one carbon-carbon double bond in it's carbon chain. Preferably, the oleaginous fluid is from about 30% to about 99% by volume of the total of the fluid. In one illustrative and preferred embodiment, the oleaginous fluid is composed of from about about 5% to about 100% by volume of the oleaginous fluid of a material selected from diesel oil, mineral oil, synthetic oil, esters, ethers, acetals, di-alkylcarbonates, olefins, combinations of these and other similar fluids used in the formulation of well bore fluids.

Optionally, the illustrative fluid may further contain a non-oleaginous fluid. Such a non-oleaginous fluid preferably constitutes from about 1% to about 70% by volume of the total fluid. In one preferred and illustrative embodiment, the non-oleaginous fluid is selected from sea water, a brine containing organic or inorganic dissolved salts, a liquid containing water-miscible organic compounds, combinations of these and similar fluids used in the formulation of similar fluids. The illustrative fluid may also optionally include weighting or bridging agents. In one preferred and illustrative embodiment, the weighting or bridging agent is selected from calcium carbonate, dolomite, siderite, barite, celestite, iron oxides, manganese oxides, ulexite, carnalite, sodium chloride combinations of these and similar compounds used in the formulation of drilling and wellbore fluids.

In addition to the fluid compositions disclosed herein, the present invention also includes the use of such fluids in the formation, recompletion and maintenance of subterranean wells. Thus, one such illustrative embodiment includes a method of forming a subterranean well. The illustrative method includes drilling the subterranean well with a rotary drill bit and a drilling fluid that includes: an oleaginous based continuous phase and a solids tolerance agent as described above. Other methods of using the fluids disclosed are also contemplated as being part of the present invention. Such other methods and uses include using the above fluids as packing fluids, completion fluids, work-over fluids, fracturing fluids, spacer fluids and other such uses for well bore fluids that are known in the art.

These and other features of the present invention are more fully set forth in the following description of embodiments of the invention.

DESCRIPTION OF ILLUSTRATIVE EMBODIMENTS

The present invention is generally directed to an oil base well bore fluid that is useful in the formulation of drilling, completing and working over of subterranean wells, preferably oil and gas wells. The fluids may also be used as packing fluids, fracturing fluids and other similar well bore uses in which solids tolerance properties are desired. The fluids of the present invention may also be used to formulate invert emulsion fluids. Uses of the well bore fluids and invert emulsion fluids should be known to one of skill in the art as is noted in the book *COMPOSITION AND PROPERTIES OF DRILLING AND COMPLETION FLUIDS*, 5th Edition, H. C. H. Darley and George R. Gray, Gulf Publishing Company, 1988, the contents of which are hereby incorporated herein by reference.

In one embodiment of the present invention, a well bore fluid is formulated to include an oleaginous fluid, and a solids tolerance agent that enables high solids loading in the fluid.

The oleaginous fluid is a liquid and more preferably is a natural or synthetic oil and more preferably the oleaginous fluid is selected from the group including diesel oil; mineral oil; a synthetic oil, such as polyolefins, polydiorganosiloxanes, siloxanes or organosiloxanes; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least about 5% by volume of a material selected from the group including esters, ethers, acetals, dialkylcarbonates, hydrocarbons, and combinations thereof.

The solids tolerance agent of the present invention is believed to have the general formula:

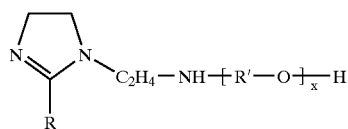

in which R is a $C_6$ to $C_{20}$ aliphatic group and R' is a $C_2$ to $C_6$ aliphatic group and x has a value from about 1 to about 10. One of ordinary skill in the art of organic synthesis by applying the skills and knowledge of retro-synthesis should be able to find a variety of synthetic pathways to the compounds of the present invention. However, in one preferred embodiment, the solids tolerance agent is the product of the reaction of an ethylene oxide with an imidazoline of a fatty acid as shown in reaction A.

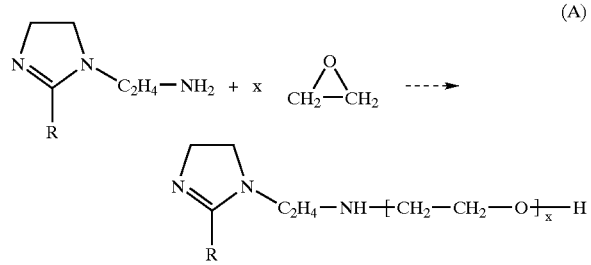

Reaction A can be carried out using alkylene oxides other than ethylene oxide as shown in the above reaction equation.

Alkylene oxide compounds are a general class of compounds in which an oxo group is bound to two adjacent carbon atoms to form a triangular ring. Often referred to as an epoxy group, such compounds are reactive with the primary amine functionality group of the imidazoline to form the compounds useful in the practice of the present invention. As previously noted the above reaction A may be carried out with a wide variety of alkylene oxide compounds. In one preferred and illustrative embodiment, the alkylene oxide is a $C_2$ to $C_4$ alkylene oxide and more preferably the alkylene oxide is ethylene oxide or propylene oxide.

The above reaction A should be carried out under conditions suitable for the reaction of the alkylene oxide with the imidazoline. Such conditions should be known to one of ordinary skill in the art of organic chemical compound synthesis after consultation with appropriate reference works.

In carrying out the reaction A, the molar ratio of imidazoline to alkylene oxide can be widely adjusted however, preferably the molar ratio is from about 2:1 to about 1:10. That is to say the value of "x" in the above reaction formula may vary from values of about 0.5 to 10. Alternative synthetic pathways may be used to achieve the same target compounds used in the present invention. Such alternative pathways will be apparent to one of skill in the art of organic synthesis.

The imidazoline of a fatty acid used above in reaction A has the general formula

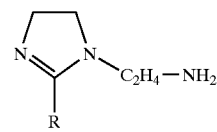

in which R is a $C_6$ to $C_{20}$ aliphatic group. We have found in one illustrative embodiment that the imidazoline is preferably the reaction product of a condensation reaction of a $C_6$ to $C_{20}$ fatty acid and diethyltriamine as shown in Reaction B.

(B)

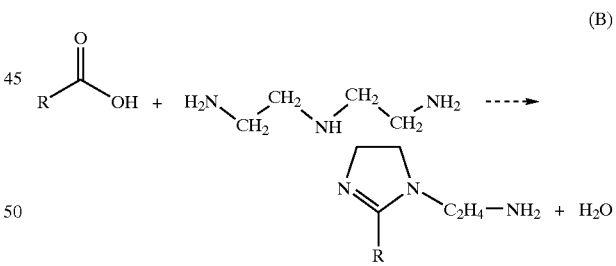

The above reaction B may be carried out with a wide variety of fatty acid compounds. In one preferred and illustrative embodiment, the fatty acid is a $C_{10}$ to $C_{20}$ fatty acid and more preferably the fatty acid contains at least one degree of unsaturation.

The above reaction B should be carried out under conditions suitable for the condensation reaction of the diethyltriamine with fatty acid. Such conditions should be known to one of ordinary skill in the art of organic chemical compound synthesis after consultation with appropriate reference works.

In carrying out the reaction B, the molar ratio of diethyltriamine to fatty acid can be widely adjusted however, preferably the molar ratio is from about 1:1. As with the final compounds, a skilled person in the art of organic synthesis should be able to reveal a variety of synthetic pathways of creating the desired imidazoline.

The amount of solids tolerance agent present in the drilling fluids of the present invention, as noted above, should be sufficient to increase the solids loading in the drilling fluid. While the concentration of the solids tolerance agent may vary depending on the particular components in the drilling fluid or mud, typically the concentration is less than about 10% by volume of the fluid. Thus in one embodiment the solids tolerance agent is preferably present in the drilling fluid at a concentration of about 0.1% to about 5.0%. More preferably the amount of solids tolerance agent in the drilling fluid should be present in a concentration of about 1 to about 5% by volume of the fluid.

The above combination of oleaginous fluid and solids tolerance agent may be used to formulate invert emulsions with non-oleaginous fluids. In one such embodiment, the non-oleaginous fluid used in the formulation of the invert emulsion fluid is a liquid and preferably is an aqueous liquid. More preferably, the non-oleaginous liquid may be selected from the group including sea water, a brine containing organic and/or inorganic dissolved salts, liquids containing water-miscible organic compounds, combinations of these and similar compounds used in the formulation of invert emulsions. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid.

In yet another embodiment of the present invention, other surfactant compounds may be used in conjunction with the solids tolerance agents utilized herein. In such cases it is important however that the quantity and nature of these supplemental surfactants should not interfere in the ability and properties given the emulsion fluid by the solids tolerance agent to act as described herein.

The fluids of the present invention are especially useful in the drilling, completion and working over of subterranean oil and gas wells. In particular the fluids of the present invention are useful in formulating drilling muds and completion fluids that require a high loading of solids content in the drilling fluid. Such muds and fluids are especially useful in the drilling of horizontal wells into hydrocarbon bearing formations.

The method used in preparing the drilling fluids of the present invention is not critical. Conventional methods can be used to prepare the drilling fluids of the present invention in a manner analogous to those normally used, to prepare conventional oil-based drilling fluids. In one representative procedure, a desired quantity of oleaginous fluid such as a base oil and a suitable amount of the solids tolerance agent are mixed together and the remaining components are added sequentially with continuous mixing. An invert emulsion based on this fluid may be formed by vigorously agitating, mixing or shearing the oleaginous fluid with a non-oleaginous fluid.

The fluids of the present invention may further contain additional components depending upon the end use of the invert emulsion so long as they do not interfere with the functionality of the solids tolerance agents described herein. For example, wetting agents, organophilic clays, viscosifiers, weighting agents, bridging agents and fluid loss control agents may be added to the fluid compositions of this invention for additional functional properties. The addition of such agents should be well known to one of skill in the art of formulating drilling fluids and muds.

Wetting agents that may be suitable for use in this invention include, crude tall oil, oxidized crude tall oil, surfactants, organic phosphate esters, modified imidazolines and amidoamines, alkyl aromatic sulfates and sulfonates, and the like, and combinations or derivatives of these. However, the use of fatty acid wetting agents should be minimized so as to not adversely effect the reversibility of the invert emulsion disclosed herein. Versawet® and Versawet®NS are examples of commercially available wetting agents manufactured and distributed by M-I L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight range are sufficient for most applications. VG-69 and VG-PLUS are organoclay materials distributed by M-I L.L.C., and Versa-HRP is a polyamide resin material manufactured and distributed by M-I L.L.C., that may be used in this invention.

Conventional suspending agents that may be utilized in this invention include organophilic clays, amine treated clays, oil soluble polymers, polyamide resins, polycarboxylic acids, and soaps. The amount of conventional suspending agent used in the composition, if any, may vary depending upon the end use of the composition. However, normally about 0.1% to about 6% by weight is sufficient for most applications. VG-69 and VG-PLUS are organoclay materials distributed by M-I L.L.C., and Versa-HRP is a polyamide resin material manufactured and distributed by M-I L.L.C., that may be used in this invention.

Weighting agents or density materials suitable for use in this invention include galena, hematite, magnetite, iron oxides, illmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

The following examples are included to demonstrate preferred embodiments of the invention. It should be appreciated by those of skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

GENERAL INFORMATION RELEVANT TO THE EXAMPLES

These tests were conducted in accordance with the procedures in API Bulletin RP 13B-2, 1990. The following abbreviations are sometimes used in describing the results of experimentation.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"AV" is apparent viscosity which is another variable used in the calculation of viscosity characteristic of drilling fluid, measured in centipoise (cp) units.

"GELS" is a measure of the suspending characteristics, or the thixotripic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss, measured in milliliters (ml) according to API bulletin RP 13 B-2, 1990.

EXAMPLE 1

A base mud was prepared having the following formulation:

| Component | Amount (g) |
| --- | --- |
| C$_{16}$–C$_{18}$ Internal olefin | 160.4 |
| 25% wt Calcium Chloride brine | 90.5 |
| Nova Mul L | 6 |
| Nova Wet | 2 |
| Lime | 5 |
| VG Plus | 4 |
| Barite | 25 |

A measured amount of the compounds of the present invention (CP1 and CP2) and Rev Dust (pounds per barrel, ppb), a drill cuttings solids substitute, were added to the base fluid and the mixture was agitated. CP1 is the reaction product of 1 mole of propylene oxide with 1 mole of the imidazoline of a C$_{16}$–C$_{18}$ fatty acid. CP2 is the reaction product of 2 moles of propylene oxide with 1 mole of the imidazoline of C$_{16}$–C$_{18}$ fatty acid. For comparison purposes a control fluid was formulated without the addition of the compounds of the present invention. The mixtures were then heat aged in rotating ovens at 250 F for 16 hours. The properties of the resulting fluids were measure and representative data is given in Table A below.

TABLE A

| Rev Dust (ppb) | | | 25 | 100 | 150 | 175 |
| --- | --- | --- | --- | --- | --- | --- |
| CP1 | | PV | 23 | 52 | 60 | 81 |
| | | YP | 14 | 31 | 34 | 9 |
| | | Gels, 10 Min. | 12 | 17 | 17 | 10 |
| | | ES | 270 | 182 | 151 | 83 |

TABLE A-continued

| Rev Dust (ppb) | | | 25 | 100 | 150 | 175 |
| --- | --- | --- | --- | --- | --- | --- |
| CP1 | | PV | 25 | 50 | 56 | 88 |
| | | YP | 11 | 24 | 24 | 37 |
| | | Gels, 10 Min. | 12 | 12 | 12 | 18 |
| | | ES | 300 | 191 | 144 | 103 |
| Control | | PV | 27 | 56 | 33 | — |
| | | YP | 13 | 31 | 34 | — |
| | | Gels, 10 Min. | 13 | 17 | 18 | 8 |
| | | ES | 257 | 178 | 146 | 43 |

Upon review of the above representative data, one of ordinary skill in the art should appreciate that the addition of CP1 and CP2 enable higher solids loading of the aged drilling fluid as compared to the control fluid.

EXAMPLE 2

A base mud with 75:25 oil:water ratio using a 25% calcuim chloride brine was prepared having the following formulation:

| Component | Amount (g) |
| --- | --- |
| C$_{16}$–C$_{18}$ Internal olefin | 160.4 |
| 25% wt Calcium Chloride brine | 90.5 |
| Nova Mul L | 6.0 |
| Nova Wet | 2.0 |
| Lime | 5.0 |
| VG Plus | 4.0 |
| Barite | 211.4 |

A measured amount of the compounds of the present invention having a variable extent of reaction with alkylene oxide was added and Rev Dust (pounds per barrel, ppb), a drill cuttings solids substitute, were added to the base fluid and the mixture was agitated. The compounds GS 1956A, Gs 1956B, GS1957A, GS1957B, GS1809A, GS1809B, GS1810A, GS1810B, GS1959, GS1960 are commercially available from Champion Chemicals. The following table provides

| Compound | Equivalents of alkylene oxide reacted with imidazoline | |
| --- | --- | --- |
| Control | 0.0 | |
| CP3 (0.5 EO-GS1956A) | 0.5 | ethylene oxide |
| CP4 (1.0 EO-GS1956B) | 1.0 | ethylene oxide |
| CP5 (1.5 EO-GS1957A) | 1.5 | ethylene oxide |
| CP6 (2.0 EO-GS1957B) | 2.0 | ethylene oxide |
| CP7 (0.38 PO-GS1809A) | 0.38 | propylene oxide |
| CP8 (0.75 PO-GS1809B) | 0.75 | propylene oxide |
| CP9 (1.125 PO-GS1810A) | 1.125 | propylene oxide |
| CP10 (1.5 PO-GS1810B) | 1.5 | propylene oxide |
| CP11 (2.0 PO-GS1810B) | 2.0 | propylene oxide |
| CP12 (5.0 PO-GS1959) | 5.0 | propylene oxide |
| CP13 (10.0 PO-GS1960) | 10.0 | propylene oxide |

The mixtures were then heat aged in rotating ovens at 150 F for 16 hours. The properties of the resulting fluids were measure at 120 F and representative data is given in Tables B, C & D below.

TABLE B

25 g Rev Dust-Heat Aged

| Fluid Properties (at 120° F.) | Control | CP3 | CP4 | CP5 | CP6 | CP7 | CP8 | CP9 | CP10 | CP11 | CP12 | CP13 |
|---|---|---|---|---|---|---|---|---|---|---|---|---|
| Rheology |  |  |  |  |  |  |  |  |  |  |  |  |
| 600 | 52 | 55 | 49 | 56 | 55 | 60 | 62 | 61 | 61 | 53 | 57 | 61 |
| 300 | 30 | 31 | 28 | 32 | 31 | 37 | 37 | 35 | 36 | 30 | 32 | 35 |
| 200 | 23 | 24 | 22 | 25 | 24 | 27 | 28 | 27 | 27 | 24 | 26 | 28 |
| 100 | 15 | 15 | 14 | 16 | 15 | 19 | 19 | 17 | 18 | 15 | 16 | 17 |
| 6 | 5 | 5 | 5 | 5 | 5 | 7 | 7 | 5 | 7 | 5 | 5 | 5 |
| 3 | 4 | 4 | 4 | 4 | 4 | 5 | 5 | 4 | 6 | 4 | 4 | 4 |
| PV | 22 | 24 | 21 | 24 | 24 | 23 | 25 | 26 | 25 | 23 | 25 | 26 |
| YP | 8 | 7 | 7 | 8 | 7 | 14 | 12 | 9 | 11 | 7 | 7 | 9 |
| Gels |  |  |  |  |  |  |  |  |  |  |  |  |
| 10 sec. | 5 | 6 | 5 | 5 | 6 | 7 | 7 | 6 | 7 | 6 | 6 | 6 |
| 10 min. | 6 | 6 | 5 | 5 | 7 | 12 | 12 | 11 | 12 | 7 | 7 | 8 |
| ES | 261 | 229 | 238 | 284 | 217 | 270 | 261 | 220 | 300 | 251 | 217 | 221 |

TABLE C

125 g Rev Dust-Heat Aged

| Fluid Properties (at 120° F.) | Control | CP3 | CP4 | CP5 | CP6 | CP7 | CP8 | CP9 | CP10 | CP11 | CP12 | CP13 |
|---|---|---|---|---|---|---|---|---|---|---|---|---|
| Rheology |  |  |  |  |  |  |  |  |  |  |  |  |
| 600 | 96 | 87 | 61 | 62 | 61 | 147 | 140 | 161 | 136 | 61 | 260 | — |
| 300 | 57 | 52 | 35 | 37 | 36 | 90 | 85 | 95 | 81 | 35 | 147 | 175 |
| 200 | 42 | 38 | 27 | 28 | 27 | 69 | 65 | 71 | 61 | 28 | 115 | 170 |
| 100 | 26 | 22 | 17 | 19 | 18 | 45 | 41 | 46 | 38 | 17 | 68 | 130 |
| 6 | 7 | 6 | 5 | 7 | 7 | 15 | 13 | 13 | 11 | 5 | 18 | 28 |
| 3 | 6 | 5 | 4 | 5 | 6 | 13 | 11 | 11 | 9 | 4 | 16 | 25 |
| PV | 39 | 37 | 26 | 25 | 25 | 57 | 55 | 66 | 55 | 26 | 113 | — |
| YP | 18 | 15 | 9 | 12 | 11 | 33 | 30 | 29 | 26 | 9 | 34 | — |
| Gels |  |  |  |  |  |  |  |  |  |  |  |  |
| 10 sec. | 7 | 7 | 6 | 7 | 7 | 15 | 13 | 13 | 10 | 6 | 28 | 100 |
| 10 min. | 9 | 8 | 11 | 12 | 12 | 18 | 15 | 15 | 12 | 9 | 31 | 110 |
| ES | 143 | 116 | 220 | 261 | 300 | 165 | 173 | 165 | 188 | 274 | 142 | 48 |

TABLE D

200 g Rev Dust-Heat Aged

| Fluid Properties (at 120° F.) | Control | CP3 | CP4 | CP5 | CP6 | CP11 | CP12 | CP13 |
|---|---|---|---|---|---|---|---|---|
| Rheology |  |  |  |  |  |  |  |  |
| 600 | OS | OS | OS | OS | OS | OS | OS | OS |
| 300 | 190 | 127 | 112 | 101 | 87 | 86 | OS | OS |
| 200 | 30 | 27 | 27 | 28 | 27 | 26 | 71 | 79 |
| 100 | 20 | 19 | 17 | 19 | 18 | 18 | 20 | 24 |
| 6 | 6 | 7 | 5 | 7 | 7 | 7 | 20 | 23 |
| 3 | 5 | 5 | 4 | 5 | 6 | 7 | — | 21 |
| Gels |  |  |  |  |  |  |  |  |
| 10 sec. | 7 | 7 | 6 | 7 | 7 | 7 | 20 | 28 |
| 10 min. | 13 | 12 | 11 | 12 | 12 | 11 | 20 | 30 |
| ES | 119 | 111 | 156 | 165 | 187 | 200 | 65 | 21 |

Note:
"OS" indicates and off-scale reading

Upon review of the above representative data, one of ordinary skill in the art should appreciate that the addition of the compounds of the present invention enable higher solids loading of the aged drilling fluid as compared to the control fluid.

In view of the above disclosure, one of ordinary skill in the art should understand and appreciate that one illustrative embodiment of the present invention includes a fluid having utility in subterranean wells and having improved solids tolerance capabilities. Such an illustrative fluid includes an oleaginous fluid; and a solids tolerance agent having the formula:

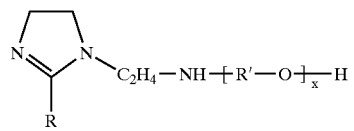

in which R is a $C_6$ to $C_{20}$ aliphatic group and R' is a $C_2$ to $C_6$ aliphatic group and x has a value from about 1 to about 10. In one preferred embodiment of the above fluid, the R' group is ethyl or isopropyl. In another preferred embodiment, the R is unsaturated having at least one carbon-carbon double bond in it's carbon chain. Preferably, the oleaginous fluid is from about 30% to about 99% by volume of the total of the fluid. In one illustrative and preferred embodiment, the oleaginous fluid is composed of from about 5% to about 100% by volume of the oleaginous fluid of a material selected from diesel oil, mineral oil, synthetic oil, esters, ethers, acetals, di-alkylcarbonates, olefins, combinations of these and other similar fluids used in the formulation of well bore fluids. Optionally, the illustrative fluid may further contain a non-oleaginous fluid. Such a non-oleaginous fluid preferably constitutes from about 1% to about 70% by volume of the total fluid. In one preferred and illustrative embodiment, the non-oleaginous fluid is selected from sea water, a brine containing organic or inorganic dissolved salts, a liquid containing water-miscible organic compounds, combinations of these and similar fluids used in the formulation of similar fluids. The illustrative fluid may also optionally include weighting or bridging agents. In one preferred and illustrative embodiment, the weighting or bridging agent is selected from calcium carbonate, dolomite, siderite, barite, celestite, iron oxides, manganese oxides, ulexite, carnalite, sodium chloride combinations of these and similar compounds used in the formulation of drilling and wellbore fluids.

Another illustrative embodiment of the present invention that should be appreciated by one of skill in the art is an invert emulsion fluid having utility for drilling, completing, or working over subterranean wells. Such an illustrative fluid is formulated to include: an oleaginous liquid; a non-oleaginous liquid; and a solids tolerance agent having the formula:

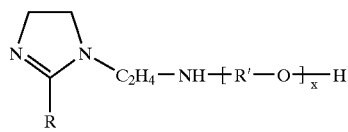

in which R is a $C_6$ to $C_{20}$ aliphatic group and R' is a $C_2$ to $C_6$ aliphatic group and x has a value from about 1 to about 10. The invert emulsion is formulated such that the oleaginous liquid is from about 30% to about 99% by volume of said fluid, the non-oleaginous liquid is from about 1% to about 70% by volume of said fluid, and the solids tolerance agent is present in said fluid at a concentration of about 0.1% to about 5.0% by weight of the total fluid. The solids tolerance agent is preferably formulated such that the R' group is ethyl or isopropyl. Alternatively, the solids tolerance agent can be formulated such that the R group is unsaturated. That is to say the R group has at least one carbon-carbon double bond. In one preferred and illustrative embodiment the oleaginous fluid is formulated such that from about 5 to about 100% by volume of the oleaginous fluid is a material selected from diesel oil, mineral oil, a synthetic oil, esters, ethers, acetals, di-alkylcarbonates, hydrocarbons, combinations of these and similar fluids used in the formulation of invert emulsion drilling fluids. The non-oleaginous liquid in one illustrative embodiment is preferably composed of sea water, a brine containing organic or inorganic dissolved salts, a liquid containing water-miscible organic compounds, combinations of these and similar fluids used in the formulation of invert emulsion drilling fluids.

A third illustrative embodiment of the present invention is a fluid having utility in subterranean wells. Such an illustrative fluid is formulated to include an oleaginous fluid and a solids tolerance agent. The solids tolerance agent is the product of the reaction of an alkylene oxide with an imidazoline of a fatty acid having the formula

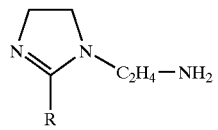

in which R is a $C_6$ to $C_{20}$ aliphatic group. The imidazoline is preferably the reaction product of a condensation reaction of a $C_6$ to $C_{20}$ fatty acid and diethyltriamine. In one preferred and illustrative embodiment, the alkylene oxide is a $C_2$ to $C_4$ alkylene oxide and more preferably the alkylene oxide is ethylene oxide or propylene oxide. In carrying out the reaction, the molar ratio of imidazoline to alkylene oxide can be from about 2:1 to about 1:10. In one preferred and illustrative embodiment, the oleaginous fluid is from about 30% to about 99% by volume of the total fluid, and preferably is composed from about 5% to about 100% by volume of a material selected from diesel oil, mineral oil, synthetic oil, esters, ethers, acetals, di-alkylcarbonates, olefins, combinations of these and similar fluids used in the formulation of drilling fluids. For another alternative and illustrative embodiment, the fluid may be formulated so as to include a non-oleaginous fluid that is preferably from about 1% to about 70% by volume of the total fluid. When a non-oleaginous fluid is included, it preferably is selected from sea water, a brine containing organic or inorganic dissolved salts, a liquid containing water-miscible organic compounds, combinations of these and similar fluids used in the formulation of drilling fluids. Optionally the illustrative fluid may include a weighting agent or a bridging agent. Preferably the weighting or bridging agent is selected from calcium carbonate, dolomite, siderite, barite, celestite, iron oxides, manganese oxides, ulexite, carnalite, sodium chloride, and mixtures of these and similar agents used in the formulation of drilling fluids.

In addition to the fluid compositions disclosed above, one of skill in the art should understand and appreciate that the present invention also includes the use of such fluids. Thus, one such illustrative embodiment includes a method of forming a subterranean well. The illustrative method includes drilling the subterranean well with a rotary drill bit and a drilling fluid that includes: an oleaginous based continuous phase and a solids tolerance agent as described above. It is preferred that the solids tolerance agent is the product of the reaction of an alkylene oxide with an imidazoline of a fatty acid having the formula

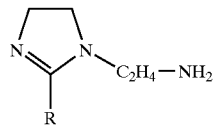

in which R is a $C_6$ to $C_{20}$ aliphatic group. It is further preferred that the imidazoline is the reaction product of a condensation reaction of a $C_6$ to $C_{20}$ fatty acid and diethyltriamine. In such an illustrative embodiment, the alkylene oxide is preferably a $C_2$ to $C_4$ alkylene oxides and more preferably ethylene oxide or propylene oxide. In carrying out the reaction between the amine and the alkylene oxide, the molar ratio of imidazoline to alkylene oxide is preferably from about 2:1 to about 1:10.

Other methods of using the fluids disclosed are also contemplated as being part of the present invention. Such alternative methods and uses include using the above fluids as packing fluids, completion fluids, work-over fluids, fracturing fluids, spacer fluids and other such uses for well bore fluids that are known in the art.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A fluid having utility in subterranean wells, said fluid comprising:
    an oleaginous fluid;
    a solids tolerance agent having the formula:

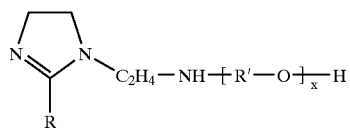

wherein R is a $C_6$ to $C_{20}$ aliphatic group and R' is a $C_2$ to $C_6$ aliphatic group and x has a value from about 1 to about 10; and
    a non-oleaginous fluid.

2. The fluid of claim 1, wherein R' is selected from ethyl and isopropyl.

3. The fluid of claim 1 wherein R is unsaturated.

4. The fluid of claim 1 wherein said oleaginous fluid comprises from about 30% to about 99% by volume of said fluid.

5. The fluid of claim 1 wherein said oleaginous fluid further comprising from about 5% to about 100% by volume of the oleaginous fluid of a material selected from a group consisting of diesel oil, mineral oil, synthetic oil, esters, ethers, acetals, di-aikylcarbonates, olefins, and combinations thereof.

6. The fluid of claim 1 wherein said non-oleaginous fluid comprises from about 1% to about 70% by volume of said fluid.

7. The fluid of claim 1 wherein said non-oleaginous fluid is selected from the group consisting of sea water, a brine containing organic or inorganic dissolved salts, a liquid containing water-miscible organic compounds, and combinations thereof.

8. The fluid of claim 1 further comprising a weighting agent or a bridging agent.

9. The fluid of claim 8 wherein the weighting or bridging agent is selected from the group consisting of calcium carbonate, dolomite, siderite, barite, celestite, iron oxides, manganese oxides, ulexite, carnalite, sodium chloride and combinations thereof.

10. An invert emulsion fluid having utility for drilling, completing, or working over subterranean wells, said fluid comprising:
    a) an oleaginous liquid, said oleaginous liquid comprising from about 30% to about 99% by volume of said fluid;
    b) a non-oleaginous liquid, said non-oleaginous liquid comprising from about 1% to about 70% by volume of said fluid; and
    c) an solids suspension agent present in said fluid at a concentration of about 0.1% to 5.0% by weight of said fluid, said solids suspension agent having the formula:

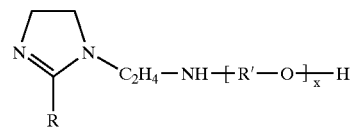

wherein R is a $C_6$ to $C_{20}$ aliphatic group and R' is a $C_2$ to $C_6$ aliphatic group and x has a value from about 1 to about 10.

11. The invert emulsion fluid of claim wherein R' is selected from ethyl and isopropyl.

12. The invert emulsion fluid of claim 10 wherein R is unsaturated.

13. The invert emulsion fluid of claim 10 wherein said oleaginous fluid further comprising from about 5 to about 100% by volume of the oleaginous fluid of a material selected from a group consisting of diesel oil, mineral oil, a synthetic oil, esters, ethers, acetals, di-alkylcarbonates, hydrocarbons, and combinations thereof.

14. The invert emulsion fluid of claim 10 said non-oleaginous liquid is selected from the group consisting of sea water, a brine containing organic or inorganic dissolved salts, a liquid containing water-miscible organic compounds, and combinations thereof.

15. The invert emulsion fluid of claim 10 wherein R is unsaturated.

16. A fluid having utility in subterranean wells, said fluid comprising:
    an oleaginous fluid;
    a solids suspension agent that is the product of the reaction of an alkylene oxide with an imidazoline of a fatty acid having the formula

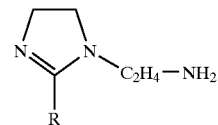

wherein R is a $C_6$ to $C_{20}$ aliphatic group, and
    a non-oleaginous fluid.

17. The fluid of claim 16 wherein the imidazoline is the reaction product of a condensation reaction of a $C_6$ to $C_{20}$ fatty acid and diethyltriamine.

18. The fluid of claim 16 wherein the alkylene oxide is selected from $C_2$ to $C_4$ alkylene oxides.

19. The fluid of claim 16 wherein the alkylene oxide is selected from ethylene oxide and propylene oxide.

20. The fluid of claim 16 wherein the molar ratio of imidazoline to alkylene oxide is from about 2:1 to about 1:10.

21. The fluid of claim 16 wherein said oleaginous fluid comprises from about 30% to about 99% by volume of said fluid.

22. The fluid of claim 16 wherein said oleaginous fluid further comprising from about 5% to about 100% by volume of the oleaginous fluid of a material selected from a group consisting of diesel oil, mineral oil, synthetic oil, esters, ethers, acetals, di-alkylcarbonates, olefins, and combinations thereof.

23. The fluid of claim 16 wherein said non-oleaginous fluid comprises from about 1% to about 70% by volume of said fluid.

24. The fluid of claim 23 wherein said non-oleaginous fluid is selected from the group consisting of sea water, a brine containing organic or inorganic dissolved salts, a liquid containing water-miscible organic compounds, and combinations thereof.

25. The fluid of claim 16 further comprising a weighting agent or a bridging agent.

26. The fluid of claim 25 wherein the weighting or bridging agent is selected from the group consisting of calcium carbonate, dolomite, siderite, barite, celestite, iron oxides, manganese oxides, ulexite, carnalite, sodium chloride and combinations thereof.

27. A method of forming a subterranean well, the method comprising
    drilling the subterranean well with a rotary drill bit and a drilling fluid; said drilling fluid including:
    an oleaginous based continuous phase and
    a solids suspension agent that is the product of the reaction of an alkylene oxide with an imidazoline of a fatty acid having the formula

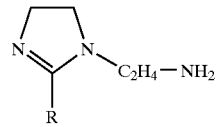

wherein R is a $C_6$ to $C_{20}$ aliphatic group.

28. The method of claim 27 wherein the imidazoline is the reaction product of a condensation reaction of a $C_6$ to $C_{20}$ fatty acid and diethyltriamine.

29. The method of claim 27 wherein the alkylene oxide is selected from $C_2$ to $C_4$ alkylene oxides.

30. The method of claim 27 wherein the alkylene oxide is selected from ethylene oxide and propylene oxide.

31. The method of claim 27 wherein the molar ratio of imidazoline to alkylene oxide is from 2:1 to about 1:10.

32. In a method of rotary drilling a subterranean well using a drilling fluid, the improvement comprising the use of a drilling fluid including:
    an oleaginous fluid; and
    a solids suspension agent having the formula:

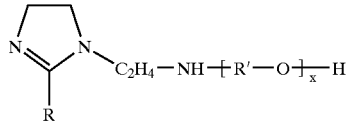

wherein R is a $C_6$ to $C_{20}$ aliphatic group and R' is a $C_2$ to $C_6$ aliphatic group and x has a value from about 1 to about 10.

33. The method of claim 32, wherein R' is selected from ethyl and isopropyl.

34. The method of claim 32 wherein R is unsaturated.

* * * * *